Feb. 25, 1941.  C. NESS ET AL  2,233,108
METHOD OF PRODUCING GAS AND A DRY RESIDUE BY THE
REACTION OF A SOLID AND A LIQUID
Filed Oct. 1, 1936   3 Sheets-Sheet 1

INVENTORS
CHARLES NESS
HUGO V. KOJOLA
BY
*Ed Greenewald*
ATTORNEY

Feb. 25, 1941.  C. NESS ET AL  2,233,108
METHOD OF PRODUCING GAS AND A DRY RESIDUE BY THE
REACTION OF A SOLID AND A LIQUID
Filed Oct. 1, 1936   3 Sheets-Sheet 3
Fig. 3
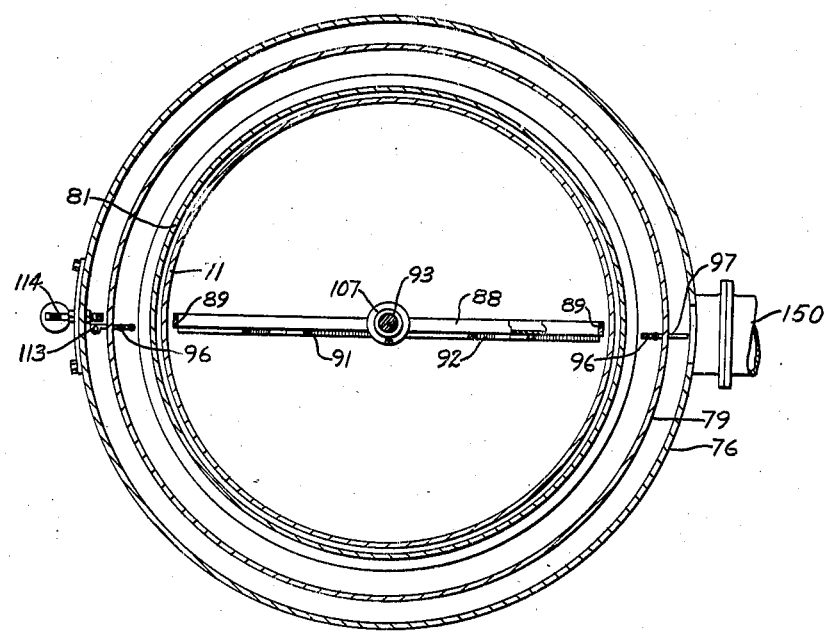
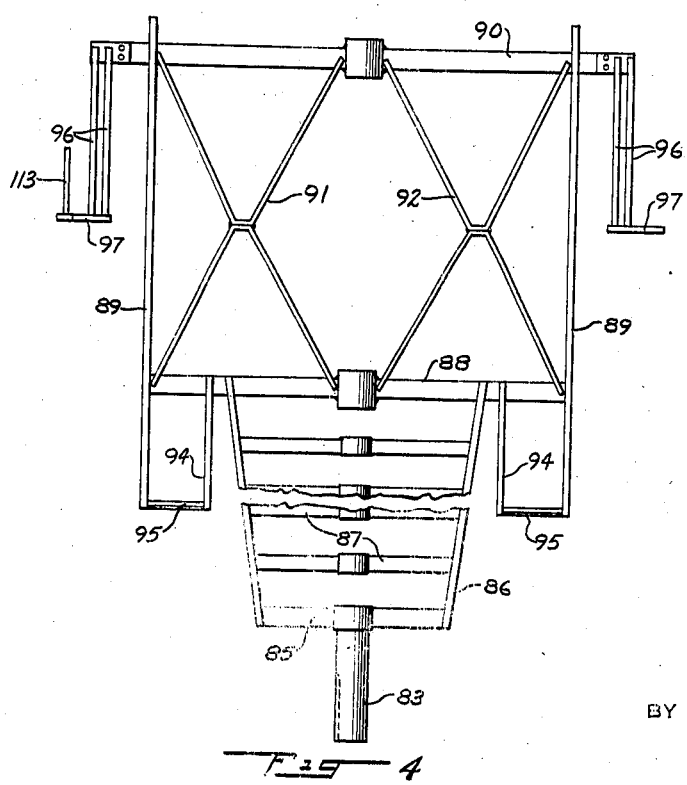
Fig. 4
INVENTORS
CHARLES NESS
HUGO V. KOJOLA
BY
ATTORNEY Patented Feb. 25, 1941

2,233,108

UNITED STATES PATENT OFFICE 2,233,108

METHOD OF PRODUCING GAS AND A DRY RESIDUE BY THE REACTION OF A SOLID AND A LIQUID

Charles Ness and Hugo V. Kojola, Indianapolis, Ind., assignors to The Prest-O-Lite Company, Inc., a corporation of New York Application October 1, 1936, Serial No. 103,526

20 Claims. (Cl. 48—216)

This invention relates to a method of producing gas and a dry residue by the reaction of a solid with a liquid, and more particularly to the production of acetylene from calcium carbide and water with the formation of a substantially dry hydrated lime residue.

Generally, the object of the present invention is to provide an improved process by which the generation of a gas and the production of a substantially dry, commercially useful residue is accomplished as a result of a controlled reaction between a solid and a liquid in a relatively simple, safe, economical and effective manner for the production of commercial volumes of gas.

More specifically, objects of the invention are to provide a process of the character indicated by which calcium carbide is continuously and completely reacted to simultaneously produce acetylene and substantially dry calcium hydrate in commercial quantities; by which the heat of the reaction is effectively controlled and dispersed so that objectionable effects of local high temperatures are avoided; which shall be inherently stable so that the quality of the residue product will be unaffected by minor variations in the supply of reactants; by which heavy impurities unavoidably introduced with the carbide and particles of unreacted carbide are prevented from passing out with, and contaminating the residue; by which water evaporated to absorb excess heat of the reaction, is prevented from unduly moistening the residue produced; by which calcium hydrate being produced is maintained in a free flowing, fluid-like condition so that a classification and counterflow of carbide and residue will occur to provide a more effective contact of carbide with water which results in rapid rates of production with more effective control of temperature; and which shall be equally effective in the use of lump, dust, granular and run-of-crusher sizes of carbide.

These and other objects of the invention and the novel features thereof which achieve these objects will become evident from the following detailed description taken in connection with the accompanying drawings, in which:

Fig. 3 is a view of a section of the apparatus shown in Fig. 2, taken on the line 3—3; and Fig. 4 is an elevational view of the agitating device shown in Fig. 2.

Figure 1:
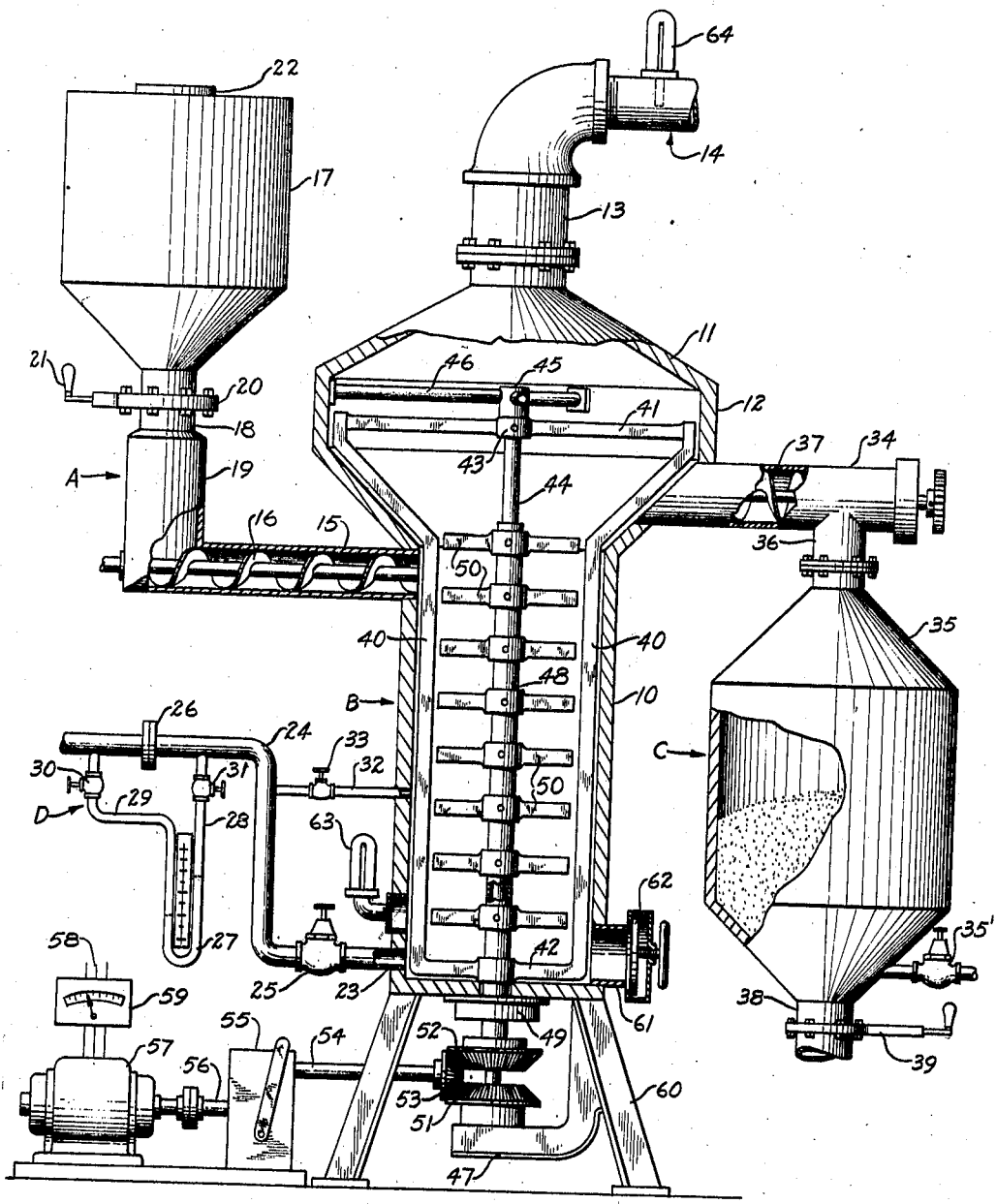
Fig. 1 is an elevational view partly in section of an apparatus for generating acetylene with the production of a substantially dry residue according to the present invention.

Acetylene is commonly generated by feeding calcium carbide into a body of water, there being a sufficient quantity of water present so that the heat produced by the reaction between the water and carbide is absorbed by the excess water as sensible heat. The residue resulting from the reaction is then in the form of a sludge. The generation of acetylene by dropping water on a mass of carbide has been found to be exceedingly dangerous unless the amount of carbide is very small and the rate of the reaction is controlled to be very slow so that the heat produced may be dissipated by conduction through the reacting mass. The use of the latter method of generation has therefore been limited to the production of very small quantities of gas such as for portable lamps and no attempt has been made in such cases to regulate the addition of water to obtain a dry residue.

To produce commercial quantities of acetylene and a substantially dry residue without encountering dangerously high temperatures, it has been proposed to add a sufficient quantity of water to carbide to satisfy the requirement for complete reaction and an additional quantity just sufficient to absorb the excess heat of reaction by its evaporation and subject the reacting materials to mechanical stirring in a horizontal retort for a considerable period until the reaction is complete. The carbide and the residue are carried along through an extended substantially horizontal path through the retort and if the quantities of water and carbide have been chosen in the proper proportion, a substantially dry residue may result at the discharge end of the retort. It is difficult however to control the temperatures locally occurring in the retort to within desired limits and at the same time obtain a residue that is either not too wet or that does not contain unspent carbide, for particles of carbide may be carried along to places where the surrounding material is too dry to complete the reaction. Considerable quantities of dust are carried by the gas passing out of the reaction zones to be deposited on the walls of gas passages whereby much difficulty is caused by clogging of such passages. The water vaporized to control temperatures is carried by the acetylene produced. Such moisture tends to condense on the dry lime produced when it cools and causes the residue to become moistened excessively.

By the present invention there is provided a method of generating acetylene which overcomes these and other difficulties. It has been discovered that freshly produced warm and dry calcium hydrate powder may be maintained in a very free flowing and fluid-like condition and that particles of carbide, being relatively heavier may be caused to fall down through a body of such hydrate. These properties are utilized in carrying out the present method of generation whereby carbide is fed into a reaction chamber into which controlled amounts of water are introduced and in which is maintained a body mixture of calcium hydrate in the desired fluid-like condition. The carbide and water react, forming acetylene and more hydrate. The carbide introduced, together with the newly-formed hydrate cause an upward displacement of the body of hydrate while the gas produced passes upward through the body of hydrate to assist in maintaining its fluid-like condition. At the top of the reaction chamber the excess hydrate over-flows and is withdrawn from further contact with gas which is collected above the reaction chamber and withdrawn to a gas holder. The contents of the reaction chamber are preferably continuously agitated by mechanical means to accelerate the reaction, to insure complete contact of carbide with water, to effect a classification of the materials so that carbide will flow downward and displace hydrate upward, and to avoid the formation of zones of local high temperature. The amount of water added is sufficiently in excess of that needed for completing the reaction to control the average temperature of the contents of the reaction chamber to within desired limits.

The upper temperature limit is generally so chosen that no decomposition of the acetylene will occur, for the products of such decompositions become impurities in the gas and tend to discolor the residue. The water that is vaporized passes off with the gas and the vapors are removed from further contact with the residue as soon as the residue leaves the reaction chamber where it was mantained at a uniform high temperature. The water is preferably added at the bottom of the reaction chamber and the zone of greatest reaction activity is maintained at this point. The carbide is caused to move downward toward the water while the hydrate is caused to move upward away from the water. This feature provides that the greatest production of heat takes place in the zone where excess water is available to absorb such heat as latent heat of evaporation and the warm gas and vapor evolved is caused to pass upward through the hydrate in the chamber to maintain it at an even temperature and in the desired fluid-like condition.

The present method of acetylene production is also inherently more stable, tending to balance out irregularities in the feed of carbide and water. For example, if a temporary excess of carbide is fed to the reaction chamber, the carbide settles to the bottom and remains until reacted with water and does not flow along to contaminate the dry lime product. If, on the other hand, a temporary excess of water enters the reaction chamber, it remains at the bottom until sufficient carbide reaches it. The stability is of great advantage in practice.

Another advantage of the present process results from preventing the heavy particles of impurities, such as ferro silicon, which are present in certain forms of commercial calcium carbide from being withdrawn with the dry residue so that the residue is not contaminated.

Refering now to the drawings, and particularly to Fig. 1, the means for supplying carbide is shown generally at A. The reaction chamber where generation of gas occurs is shown generally at B, and at C is shown means for collecting the dry residue. Means for supplying water to the reaction chamber is shown generally at D. The reaction chamber in this form of the apparatus comprises the lower portion 10 of a closed generator casing 11. The portion 10 is substantially cylindrical and its upper end joins an enlarged portion of the casing 12 wherein the gas produced separates from the particles of residue. The gas produced is let off the top of the enlarged portion 12 through a conduit 13, which connects to the pipe line 14 that conducts the gas to storage means, such as a gasometer, which is not shown in the interest of clearness of the drawing. At the upper part of the portion 10, there is connected the discharge end of a conveyor housing 15 within which is disposed a screw conveyor 16 which is rotated to feed carbide at a desired rate into the chamber 10. The grade of carbide used in this form of the apparatus is preferably granular or lump form, the particle size being that adapted to be conveyed by conveyor 16. Disposed above the carbide conveyor is a carbide storage hopper 17 which is connected to the conveyor housing 15 by a conduit 18 which has an enlarged portion 19 that provides additional storage space for carbide that may be used during periods when the hopper 17 is being recharged. The lower part of the hopper 17 is provided with a valve device 20 for shutting off the flow of carbide when desired. A handle 21 is provided for moving the slide gate within the valve 20. For filling the hopper, there is provided a removable lid 22.

Water is introduced into the reaction chamber, preferably at a point 23 close to or at the bottom of the chamber 10. The water supply is provided through the conduit 24 which is controlled by the valve 25 and which has interposed therein a metering orifice 26. Means for indicating the rate of flow of the water through the orifice is provided by a mercury-containing manometer 27 which has one leg connected by conduit 28 to the conduit 24 on the downstream side of orifice 26 and the other leg connected by conduit 29 to conduit 24 on the upstream side of the orifice 26. These two conduits are provided with stop valves 30 and 31 for disconnecting the manometer 27 when desired. A branch conduit 32 controlled by stop valve 33 connects conduit 24 with the chamber 10 at a point which is a desired distance above the bottom of the chamber. The conduit 32 may be used for an auxiliary supply of water.

The hydrated lime produced in the chamber 10 and rising therein is removed from the casing 11 by means of a conduit 34 which is connected to the portion 12 at a point just above the reaction chamber 10 and conducts the hydrated lime to the lime storage hopper 35 with which it is connected by a connection 36. The conduit 34 is preferably provided with a spiral conveyor 37 which insures the desired movement of the residue. The lower portion of the lime storage hopper 35 is provided with an outlet 38 which is controlled by a slide valve 39. A valve controlled gas inlet 35' is also provided at the lower portion of hopper 35 for introducing dry acetylene when desired to agitate the hydrate collected therein and to carry excess moisture out of the hydrate.

For insuring the proper agitation of the contents of the reaction chamber, there are provided two sets of agitators, both of which rotate about the central vertical axis of the casing 11. One agitating device comprises a frame 40 which is formed to closely follow the interior surface of the casing 11, there being two similar portions 40 which are joined at their upper and lower ends by arms 41 and 42 respectively. The arm 41 is provided with a centrally located hub 43 which is keyed to the vertical inner shaft 44. This inner shaft is journaled at its upper end in a bearing 45 which is supported within the portion 12 of the casing by means of a three-legged brace 46 whose arms are attached to the walls of the casing. The lower end of the shaft 44 is journaled in a bearing 47 externally of the casing 11. Surrounding the shaft 44, there is provided a hollow shaft 48 which passes up through a stuffing box 49 in the bottom of the chamber 10 and to which are fastened a plurality of paddles or agitator blades 50 which are distributed throughout the full length of the chamber 10. The shaft 44 is free to rotate within the shaft 48 and both shafts are preferably caused to rotate in opposite directions. The rotation is effected by means of a pair of bevel gears. The lower gear 51 of the pair is keyed to the inner shaft 44, while the upper gear 52 is keyed to the outer hollow shaft 48. Both gears 51 and 52 intermesh with a pinion 53, which, when rotated, causes the gears 51 and 52 to turn in opposite directions. Pinion 53 is mounted on the power output shaft 54 of a speed changing gear box 55. The gear box 55 is also arranged to reduce the speed of its input power shaft 56 to the speed desired for normal operation. The shaft 56 is directly connected to an electric motor 57 which is supplied with electric power through the connection 58. Interposed in the electric power supply line is a watt meter 29, which continually indicates the power being consumed in the operation of the generator. To provide space for the gearing underneath the casing, the casing is supported upon legs 60. The arm 42 is also provided with a central hub which is freely journaled upon the shaft 48 so that the scraper 40 may rotate in the opposite direction from the paddles or blades 50. The rotation of the two agitating systems in opposite directions provides for thorough agitation of the contents of the reaction chamber and is particularly effective for preventing the materials from bridging across between paddles. Near the bottom of the reaction chamber, there is provided an opening 61 for use in removing an accumulation of heavy particles of impurities, such as ferro-silicon. The opening 61 is closed by a quickly removable cover 62.

Means for indicating the temperature of the contents of the reaction chamber and of the gas produced are preferably provided. At 63 there is provided a thermometer having its temperature sensitive portion in contact with the interior of the reaction chamber at a point near the bottom thereof. The gas temperature is indicated by a thermometer 64 which has a temperature bulb projecting into the outlet conduit 14. To prevent cooling and condensation of moisture that is carried by acetylene that may come in contact with the walls of casing portion 12, conveyor 34, and hopper 35, such parts may be covered by a layer of heat insulation so that they are maintained at a temperature above the condensation point.

The operation of the apparatus shown in Fig. 1 is as follows: A charge of carbide, preferably in lump form, is placed in the hopper 17 and the lid 22 closed tight. Valve 20 is opened as by pulling the handle 21 outward and the conveyor 16 is rotated at a uniform rate. The electric motor 57 is simultaneously started up to set the agitator system in motion. When carbide starts feeding into the reaction chamber 10, the valve 25 is opened a sufficient amount to supply water at the proper rate. The carbide and water react in the lower portion of the chamber 10 and form calcium hydrate which is displaced upward, since the particles of hydrate are lighter than the particles of carbide. If the flow of water is not sufficient to react the carbide at the rate at which it is introduced, there will be an accumulation of excess carbide in the bottom of the reaction chamber 10. The heavy carbide will impede the movement of the agitator blades and more power will be consumed in turning them. The increased power consumption will be shown by the electric watt meter 59. This will indicate to the operator that the supply of water should be increased. However if too much water is added, the contents of the reaction chamber becomes heavier and less fluid-like so that the power required to turn the agitators again increases giving an immediate indication that the supply of water should be decreased. Observations of the temperature and of the moisture content of the calcium hydrate indicate how the water supply should be controlled, but changes in these factors occur a certain period of time after a change in water supply rate.

When the reaction chamber 10 fills with hydrated lime, it will reach the level of the conduit 34 and the conveyor 37 may then be rotated to remove the hydrated lime produced. As the carbide is fed into the reaction chamber, it rapidly falls down through the hydrated lime and in so doing it tends to remove any excess moisture therein. Carbide does not come actively into contact with water until it has fallen to a point near the bottom of the reaction chamber and there the zone of greatest activity is found. The thorough agitation provided by the blades 40, 42, and 50 causes a thorough and intimate mixing of the water and carbide so that the hydrated lime that forms on the surface of each lump of carbide is immediately rubbed off and is free to flow upwardly. As the agitated mass of carbide reacts, a mechanical separation of the calcium hydrate and carbide occurs, the larger particles of unspent carbide sinking to the bottom of the generator while the fine particles of hydrate accumulate at the top of the agitated mixture. The heat of the reaction that occurs in the reaction zone is greater than can be carried away as sensible heat in the products of the reaction, by heating up to temperature the materials introduced and by heat loss to the external surroundings. Therefore to carry off this excess heat, an excess of water is supplied, preferably in the zone where the greatest amount of heat is produced. This excess water absorbs a considerable quantity of heat when changing from the liquid state to the vapor state and the vapors produced escape with the gas. The volume of the hot gas generated is augmented by the water vapor and the increased volume of gas and vapor passing upward through the mixture in the generator aids in the separation of the lighter from the heavier particles and also will tend to react with some of the freshly introduced carbide as it passes downward through the mass. The movement of hot gas and vapor upward through the hydrated lime assists in maintaining the lime in a fluid-like condition.

With proper control of the rates of feeding the carbide and water, a very finely-divided product of calcium hydrate is produced which floats to the surface of the agitated mixture within the reaction chamber 10 and is withdrawn through the conduit 34 into the storage container 35 from which it is removed periodically as desired. The acetylene gas produced separates from the lime in the enlarged portion 12, the enlargement being for the purpose of reducing the velocity of the gas to a slow rate so that the fine particles of hydrate will not be carried along with the gas. The gas is thus separated from the hydrate before any appreciable cooling takes place so that the moisture which is carried by the gas does not have a chance to be condensed on the hydrate. The gas leaving the generator through conduit 14 may be conducted through a dust separating means, such as a water scrubber to remove traces of dust that may be carried along, and simultaneously the gas may be cooled to normal temperature.

Figure 2:
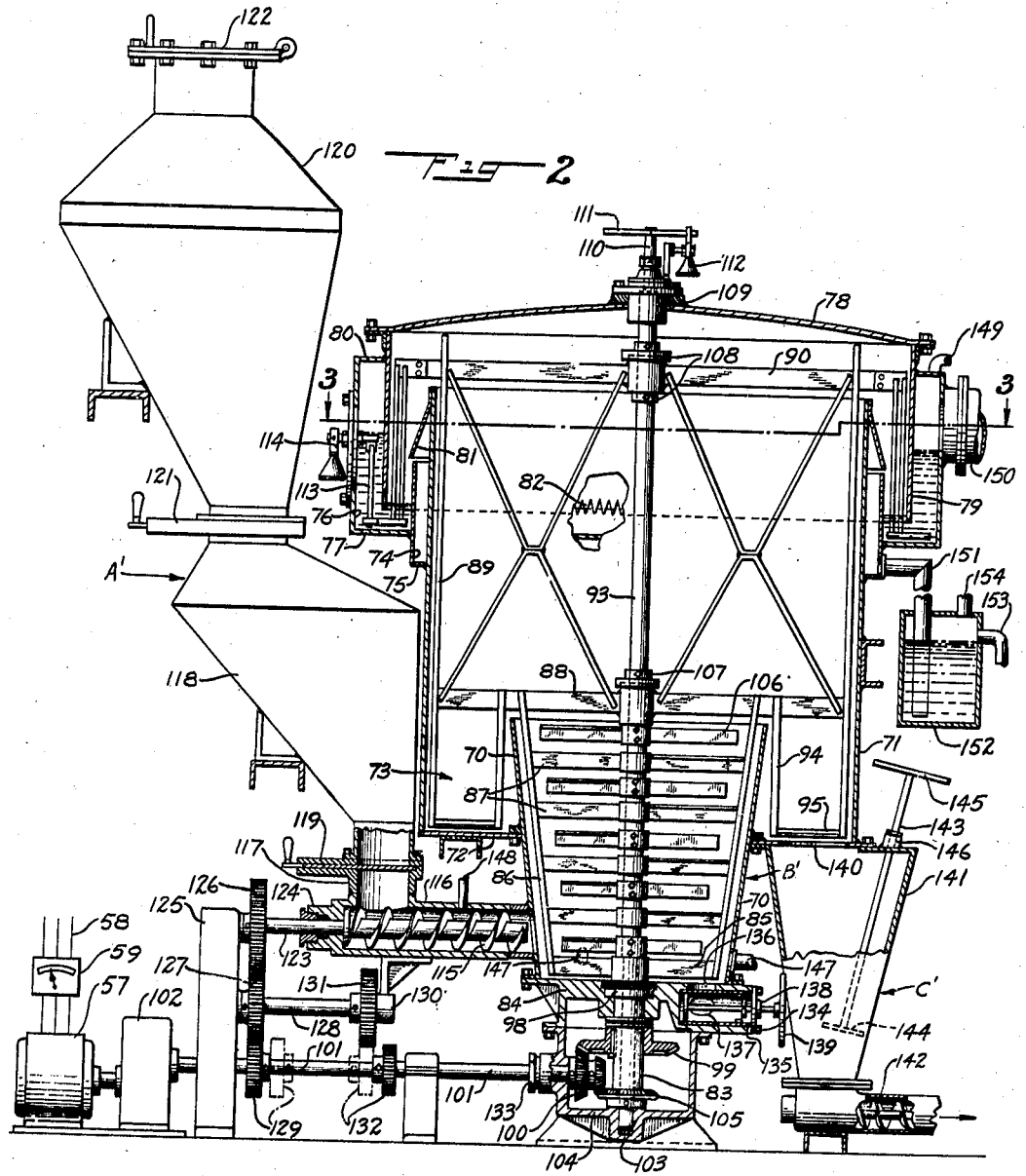
Fig. 2 is a similar view of another form of the apparatus for practicing the method of the present invention.

The apparatus shown in Fig. 2 is similar to that shown in Fig. 1, but in this form of the apparatus the carbide is fed into the reaction chamber B' near the bottom thereof from the carbide supply means which is shown generally at A'. In this form of the apparatus, the reaction chamber 70 is conical in form, the bottom being smaller in diameter than the top. Such shape provides for more efficient operation, for the velocity of flow of the products upward decreases as the cross section of the reaction chamber increases. The upper chamber 71 in this embodiment comprises an open top tank having a bottom 72 through which the reaction chamber 70 passes centrally and which is joined to the outer walls of the reaction chamber on a line substantially midway between the top and bottom of the reaction chamber. This construction forms an annular lime collecting space or compartment 73 surrounding the upper part of the reaction chamber. At a point near the top end of the upper chamber, there is provided an annular open top chamber 74 outside of the tank 71 which has a closed bottom that is welded to the side of the tank 71. Outside of the annular chamber 74 is disposed an annular water seal chamber 76 having a closed bottom 77 that is welded to the side of chamber 74. A sheet metal cover 78 for the tank 71 is provided having a depending cylindrical skirt portion 79 that extends down into the water seal 76 to a point close to the bottom 77 thereof. The cover 78 is formed higher in the central portion so that moisture that may condense thereon will flow to the edges and run down into the seal 76. The top of the water seal 76 is closed by an annular ring 80 which is welded to the upper edge of the seal 76 and to the upper portion of the skirt 79. An apron or baffle 81 surrounds the upper edge of the tank 71 in order to prevent particles of lime from falling down into the annular chamber 74. The lower edge of the skirt 79 is serrated, as shown at 82, for the purpose of providing an even distribution of gas that flows under the edge of the skirt 79 through the water seal. The water seal 76 thus constitutes an integral annular scrubber for the gas produced. This construction forms the subject matter of United States Patent 2,189,762, granted February 13, 1940, to Maurice O'Brian.

The agitating mechanism in this form of the apparatus is also provided with portions that rotate in opposite directions. In this case, however, the outer hollow shaft 83 does not extend through the reaction chamber but ends at a point just within the bottom 84 of the reaction chamber 70. The upper end of the shaft 83 is joined to the central hub of a cross-arm 85 whose outer ends are fastened to the two upwardly extending non-parallel members 86 of the main agitator frame which is shown more clearly in Fig. 4. A plurality of spaced cross-arms 87 parallel to the arm 85 are also provided joining the members 86. The members 86 are arranged to closely follow the conical wall of the reaction chamber 70 and their upper ends, which extend just above the upper edge of the reaction chamber, are joined by a horizontal cross member 88. The member 88 is so long as to almost touch opposite portions of the wall of the tank 71. Secured to each end of the cross member 88 are two vertical scraper bars 89. These bars follow closely the cylindrical wall of the tank 71 to prevent any adherence of lime thereon. The bars 89 extend slightly above the edge of the tank 71 where they are joined by an upper cross member 90 whose ends extend to within a short distance from the cylindrical wall of the skirt 79. As best shown in Fig. 4, the members 88, 89, and 90 are maintained in the desired relation by two X-shaped cross frames 91 and 92 whose ends are welded to the members 88 and 90. Hollow hubs are provided at the central portion of each of the members 85, 87, 88, and 90. These hubs have bores which freely rotate upon a shaft 93 which passes axially through the generator in the vertical direction. Scrapers for stirring the lime that collects in the annular chamber 73 are provided by the depending bars 94 whose lower ends are joined to the lower ends of the vertical members 89 by cross bars 95 and whose upper ends are welded to the cross member 88. Means is also provided for stirring the water in the scrubber water seal 76. This means comprises two pairs of vertical bars 96, each pair fastened to opposite ends of the member 90 and having their lower ends attached to a horizontal scraper 97 which closely follows the bottom 77 of the water seal.

The hollow shaft 83 projects through a sealing means 98 which is in the bottom 84 of the reaction chamber. The portion of the shaft 83 which extends below the bottom 84 is keyed to a bevel gear 99 that meshes with one of a pair of pinion bevel gears 100 that is mounted on the power output shaft 101 of a speed reducer 102. The long vertical inner shaft 93 has its lower end journaled in a bearing 103 which is in the bottom of a gear box 104 that fully encloses the bevel gears and which is fastened to the bottom 84. Another bevel gear 105 is keyed to the shaft 93 and meshes with the other of the pinions 100 so that the shaft 93 may be driven in an opposite direction and preferably at a slightly greater speed than the shaft 83. On the portion of the shaft 93 that passes through the reaction chamber 70, there is mounted a plurality of paddle blades 106 at points intermediate between the cross members 87. Both blades 106 and 87 may be arranged to provide an upward or downward thrust on the materials being stirred in order that the agitation of the materials may be more thorough. It is generally preferable to provide an upward thrust so as to avoid packing and keep the materials in a looser condition. Also fastened to the shaft on the upper side of the hub of cross member 88 is a set collar 107 which prevents upward shifting of the hub, and on either side of the hub of the cross member 90 there are also provided a pair of set collars 108. The shaft 93 is journaled at its upper end in a bearing 109 that is mounted in the cover 78. The upper end of the shaft 93 is also provided with a reduced portion 110 which passes through a stuffing box at the top of the bearing where it is provided with a cross arm bell strike 111. The strike 111 is arranged to ring a bell 112 twice upon each revolution of the inner paddle assembly. The bell is for the purpose of notifying an operator that the paddle assembly is rotating properly. Another alarm bell is provided to indicate that the outer paddle assembly carrying the scrubber scraper 97 is operating properly. To this end one of the scrapers 97 is provided with a vertical arm 113 which strikes a depending portion of one end of the bell shaft 114 so as to tilt the bell mounted on the other end and cause it to ring once upon each revolution of the scraper. The shaft 114 passes horizontally through a seal bearing in the cylindrical outer wall of scrubber chamber 76.

The carbide is introduced at a point close to the bottom 84 of the reaction chamber 70 by means of the conveyor 115 which operates in the housing 116, and the one end of which connects with the chamber 70, the other end being connected to the outlet 117 of a carbide hopper 118. The outlet 117 is controlled by a sliding type of valve 119. A second carbide supply hopper 120 is disposed above the hopper 118. In the connection between the hoppers 118 and 120, there is a second carbide valve 121. The hopper 120 is sealed by a lid 122. The shaft of the conveyor 115 passes through a stuffing box 124 in the end of the housing 116 and has an outer end which is journaled in the top bearing carried by the bearing support 125. A gear 126 is mounted on the shaft 123 between bearing 125 and stuffing box 124. The gear 126 is driven by an intermediate gear 127 which is mounted on a countershaft 128. The intermediate gear in turn is driven by a gear 129 which is mounted on the shaft 101. The countershaft 128 has its ends journaled in a bearing in the bearing stand 125 and in a bracket bearing 130 which is mounted in a support that extends from the underside of the housing 116. Another and larger intermediate gear 131 is also mounted on the shaft 128 and a corresponding smaller gear 132 is mounted on the shaft 101 in such a way that it may be shifted into engagement with the gear 131 or out of engagement therewith as desired. The gear 129 may also be shifted along the shaft 101 so that the countershaft 128 may be driven by either gear 129 or gear 132. Since the gears 129 and 132 are of different size, the shaft 128 and conveyor 115 will be driven at different rates of speed according to the gear ratio selected. Rate of feed of carbide may thus be varied as desired to change the rate of gas production.

The shaft 101 passes through the lower bearing in the bearing stand 125 and is connected to the output side of the speed reducer 102 which is driven by the electric motor 57. A stuffing box 133 is provided at the point where shaft 101 passes through the gear housing 104 so that the gear housing may be maintained substantially filled with gear lubricant. This seal also tends to prevent material from passing from the reaction chamber through the seal 98.

Since certain grades of commercial calcium carbide are relatively impure and contain such heavy impurities as silicon carbide, ferro-silicon, and oxide of iron and aluminum, means is provided for removing such impurities. Removal of such impurities that may collect in the bottom of the reaction chamber 70 is provided by a valve device 134. This device comprises a cylindrical bore formed in the bottom 84, within which is fitted a rotatable sleeve 135. The bore has an opening 136 communicating with the chamber 70 and the sleeve 135 has a corresponding opening 137 in its wall which may be made to register with the opening 136 so that heavy particles that collect on the bottom of the chamber 70 will be swept around by the arm 85 so as to fall through the openings 136 and 137 into the chamber within the sleeve 135. When the sleeve is filled with such particles, it is rotated so that the opening to chamber 70 is closed off and then the cover 138 may be removed and the impurities taken out of the sleeve chamber without further loss of material from the chamber 70. The handle 139 is used to rotate the sleeve 135 while the cover 138 is in the closed position.

The substantially dry residue produced which collects in the annular compartment 73 is moved around by the arms 95 so that it falls through an opening 140 located in the bottom 72 of the tank 71. A receiving chamber 141 is connected immediately below the opening 140 so as to receive the residue. The lower end of chamber 141 communicates with a lime conveyor 142 that withdraws the hydrated lime that collects in chamber 141 and deposits it in a storage hopper which is not shown in the drawings. To prevent gas from passing out through the opening 140, chamber 141, and conveyor 142, a dust seal is maintained in the chamber 141. This seal is provided by maintaining a supply of the dry hydrate in the lower part of the chamber. To determine the amount of residue collected in the chamber 141, there is provided an indicating means in the form of a rod 143 having at its lower end a disk 144 and at its upper end a handle 145. The rod passes through the top of the chamber 141 through a stuffing box 146 and by moving the rod 143 up and down the height of the lime in the chamber may be readily determined. The operation of the conveyor 142 is so controlled that a supply of lime is caused to remain in the lower part of the chamber 141 so as to maintain the seal.

The water required for the reaction and for absorption of excess heat is added at points 147 close to the bottom of the reaction chamber 70. The rate of flow of the water supply may be determined by means of a flow meter comprising an orifice 26 and manometer 27 as shown in Fig. 1 or by any means for maintaining a regulatable constant supply of water such, for example, as a positive displacement pump whose speed of operation may be regulated. If desired, water for initially contacting the carbide being supplied to the reaction chamber may be introduced through a conduit 148 which is connected to the conveyor housing 116.

A supply of water is added to the scrubber seal 76 through the connection 149 which is located in the cover 80 of the seal. Excess water normally flows out of the seal through the gas outlet pipe 150 which is connected to the outer wall of the seal 76 at a desired point. This overflow water runs along the conduit 150 until it reaches a draining conduit depending therefrom or any desired water operating means. The annular chamber 74 is provided so that water which might be driven backward by an abnormal backflow of gas through this scrubber will be caught by the chamber 74 instead of being carried into the tank 71. To remove water that may reach the chamber 74, there is provided a drain conduit 151 connected to the lower part of the chamber 74 and depending down into a water seal 152. The depth of the seal 152 is sufficient to provide a head of water greater than the normal pressure of the gas in the generator. The water seal 152 is provided with an overflow drain 153 and a vent pipe 154, both connected to the upper portion thereof.

The operation of the form of apparatus shown in Fig. 2 is similar to that of Fig. 1. In this form, however, calcium carbide of any form may be used, that is, lump, dust, or run-of-crusher sizes, the maximum size of the lumps being limited to that which can be conveyed by the feeding device. The very fine particles of carbide introduced into the reaction chamber 70 are heavier than the calcium hydrate and therefore tend to remain in the chamber to be converted into acetylene and hydrate. The larger particles, of course, settle more rapidly and remain at lower levels in the chamber where greater moisture is available for reacting them.

The carbide is fed into the chamber 70 by conveyor 115 at a substantially constant rate determined by the gear ratio of the gears 127 and 129, or 131 and 132 selected. The water is introduced at a constant rate which is regulated according to the temperature and the moisture content of the lime product. This rate must be maintained despite variations in back pressure at the water inlets which may occur due to particles being pressed against the inlets. It is therefore preferable to have a plurality of such inlets, and, to maintain the flow constant, the water may be supplied from a high pressure source and a differential pressure regulator interposed in the pipe line or a positive displacement pump whose speed or volumetric displacement are regulatable may be employed. A portion of the water for initially contacting the carbide may be added if desired in the conveyor 116 through inlet connection 148 or just as the carbide enters the reaction chamber.

Rotation of the paddle assemblies keeps the mixture of carbide and hydrate in the reaction chamber thoroughly agitated while the gas and vapor flowing upward assist the agitation and tend to make the hydrate more fluid-like. The carbide particles remain in the chamber 70 until consumed but the hydrate overflows the top of the chamber 70 and falls into the annular compartment 73. Here the hydrate is stirred and swept around by the scrapers 95 so as to fall through opening 140 into the hopper 141 at a rate such as to maintain a plug of hydrate in the bottom of the hopper so that gas will not escape to the conveyor 142. Any other means for effecting a gas seal while withdrawing the hydrate might be used. The calcium hydrate may be stirred for an additional period in the compartment 73 if desired by providing the outlet for hydrate in the side wall 71 instead of in the bottom at opening 140. Such additional stirring will tend to produce a more uniform product.

The acetylene and water vapor are released at the top of the reaction chamber into the relatively large space above, formed by the tank 71 and cover 78. In this space the velocity of flow is so reduced that the finer particles of hydrate settle down and the gas flows over the upper edge of tank 71, down between skirt 79 and chamber wall 74 and up through the water in the space between skirt 79 and seal wall 76. The serrations 82 cause the gas to pass in very small bubbles which provide thorough contact with the water in the seal which consequently removes the last traces of hydrate and cools the gas to a desired temperature. A substantial portion of the vapor carried by the gas is condensed and flows off with the overflow water of the seal.

When first starting up the generator, the motor 57 is started, water is admitted to the scrubber at inlet 149 and the carbide valve 119 opened. When carbide enters the chamber 70 admission of water is begun. When shutting down the generator, the carbide valve 119 is first shut off, the water is allowed to enter for a specified period of time and is then shut off and the paddles are kept turning for an additional period to insure that the moisture is evenly distributed and dispersed. The generator may then stand idle for a period without danger of lime caking in the reaction chamber.

It has been found that when the water supply is properly regulated in accordance with the rate of supply of carbide and the degree of agitation, the maximum temperature reached in the reaction zone in chamber 70 may be maintained at a safe value such that no polymerization of acetylene or discoloration of the hydrate results. For example it has been found desirable to so operate the present apparatus that the temperature of the outer wall of the reaction chamber is maintained at about 250° F.

The apparatus disclosed herein forms the subject matter of our divisional application Serial No. 241,144, filed November 18, 1938, and entitled "Apparatus for producing gas and a dry residue by the reaction of a solid and a liquid."

With the present process and apparatus operated as described, a hydrated lime product having a residual moisture content of about 3% was obtained when a ratio of 1 lb. of water to 1 lb. of carbide was maintained. This ratio will vary slightly according to the purity of the carbide used. Such a moisture content is desired in commercial lime hydrates for then the handling properties of the material are best. It is therefore seen that the process of the present invention provides for the production of acetylene at relatively rapid rates from carbide and the simultaneous production of a high quality commercially useful hydrated lime by-product.

We claim:

1. Process for producing a gas and a substantially dry residue by the action of a solid and a liquid, which comprises bringing controlled amounts of said solid and said liquid into contact in a reaction zone thereby forming a mixture of reacting materials, said amounts being proportioned so as to complete the reaction to form a substantially dry residue and said gas, and said liquid being introduced into the lower portion of said reaction zone; agitating said mixture to cause selective upward movement within said mixture of said residue by the displacing action of said solid to move said residue out of said reaction zone; causing said solid to be retained in said reaction zone for complete conversion; and separately collecting the gas and the substantially dry residue.

2. In a process for producing a gas and a substantially dry residue by the reaction of a solid and a liquid, the steps comprising bringing controlled amounts of said solid and said liquid into contact in the lower part of a reaction zone thereby forming a mixture of reacting materials, said amounts being proportioned so as to complete the reaction to form a substantially dry residue and said gas, agitating said mixture to cause upward movement within said mixture of the gas and residue products to a point out of said reaction zone by the displacing action of said solid, retaining said solid in said reaction zone until completely reacted, and separately withdrawing the gas and substantially dry residue.

3. Process for producing a gas and a substantially dry residue by the reaction of a solid and a liquid, which comprises bringing controlled amounts of said solid and said liquid into contact in a reaction zone and thereby form a mixture of reacting materials, said amounts being proportioned so as to complete the reaction to form a substantially dry residue and said gas, and said liquid being introduced into the lower portion of said reaction zone; retaining said solid in said reaction zone until completely reacted; continuously agitating said mixture and withdrawing the gas produced from the upper portion of said reaction zone, so as to maintain said residue in a fluid-like condition and float said residue upwardly out of said reaction zone by the displacing action of said solid and the buoyant effect of the upward passage of said gas; and separating said gas from said residue and separately collecting said residue.

4. Process for producing a gas and a substantially dry residue by the exothermic reaction of a solid and a liquid which comprises, bringing controlled amounts of said solid and said liquid into contact in a reaction zone thereby forming a mixture of reacting materials, said amounts being proportioned so as to complete the reaction to form a substantially dry residue and said gas and at least the major portion of said liquid being introduced near the bottom of said reaction zone, retaining said solid in the reaction zone until completely reacted, controlling the temperature of said reaction zone to below a desired upper limit by introducing additionally a sufficient quantity of liquid not required for completing the reaction for absorbing by its evaporation the excess heat of the reaction, removing the vapors so produced with the gas generated, agitating said mixture to promote the flow of the products of the reaction together upwardly out of the reaction zone by the combined displacing action of the incoming solid and the buoyant action of the generated gas, separating the gas and vapor from the residue and separately collecting the substantially dry residue and withdrawing the gas and vapor.

5. Process for producing a gas and a substantially dry residue by the exothermic reaction of a solid and a liquid, which comprises bringing controlled amounts of said solid and said liquid into contact in a reaction zone near the lower end thereof and thereby forming a mixture of reacting materials, said amounts being proportioned so as to complete the reaction to form a substantially dry residue and said gas; retaining said solid in the reaction zone until completely reacted; agitating said mixture to accelerate the reaction and substantially equalize the temperatures locally attained in the reaction zone, and also to promote a selective upward movement of said residue to the upper portion of said reaction zone by the combined displacing action of the solid and the buoyant action of the generated gas; and separately collecting the gas and the substantially dry residue.

6. A process for producing a gas and a substantially dry residue by the exothermic reaction of a solid and a liquid, which comprises bringing controlled amounts of said solid and said liquid into contact in the lower portion of a reaction zone thereby forming a mixture of reacting materials, said amounts being proportioned so as to complete the reaction to form a substantially dry residue and said gas; retaining said solid in the reaction zone until completely reacted; controlling the mean temperature of said reaction zone to a value below a safe upper limit by introducing additional quantities of a liquid sufficient for absorbing by its evaporation the excess heat of reaction, and removing the vapors so produced with the gas generated; agitating said mixture to accelerate the reaction and substantially equalize the temperatures locally attained in the reaction zone, and also to promote the flow of substantially dry residue upwardly and out of the reaction zone by the combined displacing action of the solid and the buoyant action of the generated gas; separating the gas and vapor from the residue; and separately collecting the substantially dry residue and withdrawing the gas and vapor.

7. Process for reacting a solid and a liquid for producing a gas and a substantially dry residue which comprises, introducing said solid into a reaction chamber, introducing controlled amounts of said liquid into the reaction chamber so as to contact said solid and produce said gas and a substantially dry residue, at least a substantial portion of said liquid being introduced near the lower end of said reaction chamber, accumulating in said chamber a mixture comprising said solid and residue, agitating said mixture to cause movement of said solid toward the point of feeding said liquid and movement of said residue countercurrently with respect to said solid and away from said point, and separately collecting the gas and the residue.

8. Process for reacting a solid and a liquid for producing a gas and a substantially dry residue, which comprises introducing said solid into a reaction chamber; introducing controlled amounts of said liquid into the reaction chamber near the bottom thereof so as to contact said solid and produce said gas and a substantially dry residue; accumulating in said chamber a mixture comprising said solid and residue; agitating said mixture so as to effect a classification of the components thereof whereby the relatively lighter residue component is displaced upwardly by the heavier solid component; withdrawing said residue from the upper portion of said mixture; and separately withdrawing the gas.

9. Process for reacting a solid and a liquid for producing a gas and a substantially dry residue which comprises, introducing said solid into a reaction chamber at a point above the bottom thereof, introducing controlled amounts of said liquid at a point below the point of introduction of the solid, accumulating in said chamber a mixture comprising said solid and products of reaction including the substantially dry residue, agitating said mixture to cause movement of said solid in a downward direction within the mixture to contact and react with liquid introduced and be converted into gas and residue, maintaining said residue within said mixture in a substantially fluid-like condition, causing said residue, by the displacing action of said solid, to flow upwardly within said mixture and to flow over the top of said reaction chamber, and separately withdrawing the gas and said residue in a substantially dry condition.

10. Process for reacting a solid and a liquid for producing a gas and a substantially dry residue which comprises, introducing said solid into a reaction chamber at a point above the bottom thereof, introducing controlled amounts of said liquid at a point below the point of introduction of the solid, accumulating in said chamber a mixture comprising said solid and products of reaction including the residue, causing said gas to flow upward through said mixture to maintain the residue in a fluid-like condition, continuously agitating the components of said mixture to effect improved contact of said solid and liquid, to accelerate the reaction, and to cause counter-flow of solid downward and residue in an upward direction, continuously removing residue from the upper portion of said chamber, collecting and removing particles of unreacted material from the lower portion of said chamber and collecting and withdrawing said gas from above said chamber.

11. Process of continuously producing acetylene and substantially dry calcium hydroxide from calcium carbide which comprises, continuously agitating a substantially dry mixture comprising calcium carbide and calcium hydroxide so as to effect a classification by gravity of the constituents thereof, continuously adding limited amounts of water to the lower portion of said mixture, continuously adding calcium carbide to said mixture in amounts sufficient to replenish that reacted, and continuously removing substantially dry calcium hydroxide product from the upper portion of said mixture.

12. Process of continuously producing acetylene and substantially dry calcium hydroxide from calcium carbide which comprises, continuously agitating a substantially dry mixture comprising calcium carbide and reaction products so as to effect a classification of the constituents thereof, continuously adding limited amounts of water to the lower portion of said mixture, the amount of water employed being not more than that necessary to effect conversion of the calcium carbide into acetylene and calcium hydroxide and to absorb by evaporation sufficient of the heat of reaction to maintain the temperature below a safe predetermined limit, continuously adding calcium carbide to said mixture, and continuously removing substantially all the dry calcium hydroxide from the upper portion of said mixture.

13. Process of continuously producing acetylene and substantially dry calcium hydroxide from calcium carbide which comprises, continuously agitating a mixture comprising calcium carbide and reaction products so as to effect a classification of the constituents thereof, continuously adding limited amounts of water to the lower portion of said mixture, the amount of water employed being not more than that necessary to effect conversion of the calcium carbide into acetylene and calcium hydroxide and to absorb by evaporation sufficient of the heat of reaction to maintain the temperature below a safe predetermined limit, continuously adding calcium carbide to said mixture, causing the acetylene and vapors generated to pass upward through said mixture so as to maintain the calcium hydroxide in a fluid-like condition and to promote said classification, separating said acetylene and vapors from the calcium hydroxide above said mixture and continuously removing substantially all the dry calcium hydroxide from the upper portion of said mixture.

14. Process of continuously producing acetylene and substantially dry calcium hydroxide from calcium carbide which comprises, continuously agitating a mixture comprising calcium carbide and calcium hydroxide so as to effect a classification of the constituents thereof, continuously adding limited amounts of water to the lower portion of said mixture, the amount of water employed being not more than that necessary to effect conversion of the calcium carbide into acetylene and calcium hydroxide and to absorb by evaporation sufficient of the heat of reaction to maintain the temperature below a safe predetermined limit, continuously adding calcium carbide to said mixture, causing the acetylene and vapors generated to pass upward through said mixture so as to maintain the calcium hydroxide in a fluid-like condition and to promote said classification, separating said acetylene and vapors from the calcium hydroxide above said mixture and continuously removing substantially dry calcium hydroxide from the upper portion of said mixture, and collecting and removing relatively heavy particles of unreacted material from the lower portion of said mixture.

15. Process for producing acetylene and substantially dry calcium hydrate from calcium carbide, which comprises introducing calcium carbide into a reaction zone; introducing controlled amounts of water into the lower portion of said reaction zone, the amounts of water introduced being so proportioned that a substantially dry calcium hydrate is produced; agitating the reacting constituents to cause a selective upward movement of hydrate to the upper portion of said reaction zone by the displacing action of said carbide; retaining said carbide in said reaction zone until substantially completely reacted; and withdrawing the acetylene from the reaction zone and separately collecting the substantially dry hydrate.

16. Process for producing acetylene and substantially dry calcium hydrate from calcium carbide, which comprises bringing controlled amounts of calcium carbide and water into intimate contact near the lower end of a reaction zone thereby forming a mixture of reacting materials, said amounts being proportioned so as to form acetylene and a substantially dry hydrate; retaining calcium carbide in the reaction zone until completely reacted; maintaining the hydrate in a fluid-like condition by passing acetylene therethrough; agitating said mixture to promote the flow of said hydrate out of said reaction zone by the combined displacing action of the carbide and the buoyant action of the generated gas; separating the acetylene from said hydrate; and separately withdrawing the acetylene and said substantially dry hydrate.

17. Process for producing acetylene and substantially dry calcium hydrate from calcium carbide, which comprises bringing controlled amounts of calcium carbide and water into intimate contact in a reaction zone thereby forming a mixture of reacting materials, said amounts being proportioned so as to form acetylene and a substantially dry hydrate, and said water being introduced into the lower portion of said reaction zone; retaining calcium carbide in the reaction zone until completely reacted; controlling the mean temperature of said reaction zone to a value below a desired safe upper limit by introducing additional water sufficient for carrying away by its evaporation excess heat of reaction, and removing vapor so produced with the acetylene generated; agitating the mixture of reacting materials to accelerate the reaction and substantially equalize the temperature locally attained in the reaction zone, and also to promote the flow of the products of reaction out of the reaction zone by the displacing action of the carbide; separating the acetylene and vapor from the hydrate; and separately collecting the substantially dry calcium hydrate and withdrawing the acetylene and vapor.

18. Process for producing acetylene and substantially dry calcium hydrate from calcium carbide which comprises bringing controlled amounts of calcium carbide and water into intimate contact in the lower portion of a reaction zone, accumulating in said zone a mixture comprising said carbide and substantially dry calcium hydrate product of the reaction, mechanically agitating said mixture to promote classification of the constituents thereof and displacement of hydrate out of said zone by the displacing action of the incoming carbide, subjecting the hydrate displaced from said zone to additional agitation so as to improve the quality of the calcium hydrate product and separately withdrawing acetylene and calcium hydrate.

19. Process for producing acetylene and substantially dry calcium hydrate from calcium carbide which comprises feeding calcium carbide into a reaction chamber at a point above the bottom thereof, adding limited amounts of water at a point below the point of feeding the calcium carbide, accumulating in the chamber a mixture comprising calcium carbide and calcium hydrate, agitating said mixture to cause downward movement of the calcium carbide so as to contact and react with the water introduced and be converted into acetylene and hydrate, maintaining the hydrate in a fluid-like condition, causing said hydrate to flow upwardly and concurrently with the acetylene by the displacing action of the calcium carbide promoted by the agitation of said mixture, collecting and withdrawing the substantially dry calcium hydrate which rises to the top of the chamber, and separately collecting and withdrawing the acetylene from above said chamber.

20. Process for producing acetylene and substantially dry calcium hydrate from calcium carbide which comprises feeding calcium carbide into a reaction chamber at a point above the bottom thereof, adding limited amounts of water at a point below the point of feeding the calcium carbide, accumulating in the chamber a mixture comprising calcium carbide and calcium hydrate, causing the generated acetylene to flow upwardly through said mixture to maintain the hydrate component in a fluid-like condition, continuously agitating the components of said mixture to effect improved contact of the calcium carbide and water, accelerate the reaction and promote movement of the calcium carbide downwardly so as to displace hydrate in an upward direction, removing substantially dry hydrate from the upper portion of said mixture, collecting and removing particles of unreacted impurities from the bottom of said chamber, collecting acetylene above said chamber and cleaning said acetylene as withdrawn.

CHARLES NESS.
HUGO V. KOJOLA.

CERTIFICATE OF CORRECTION.

Patent No. 2,233,108.

February 25, 1941.

CHARLES NESS, ET AL.

It is hereby certified that error appears in the printed specification of the above numbered patent requiring correction as follows: Page 2, first column, line 11, strike out the word "body"; line 67, for "The" read --This--; page 3, first column, line 39, for the reference numeral "29" read --59--; page 5, second column, line 70, for the word "operating" read --separating--; page 6, second column, line 51, claim 1, for "action" read --reaction--; and that the said Letters Patent should be read with this correction therein that the same may conform to the record of the case in the Patent Office.

Signed and sealed this 25th day of March, A. D. 1941.

Henry Van Arsdale,
Acting Commissioner of Patents.

(Seal)